Patented Jan. 26, 1954

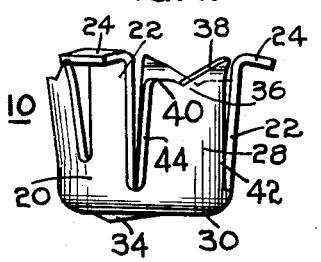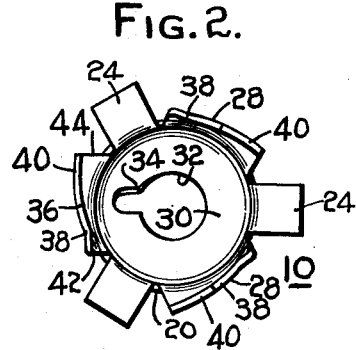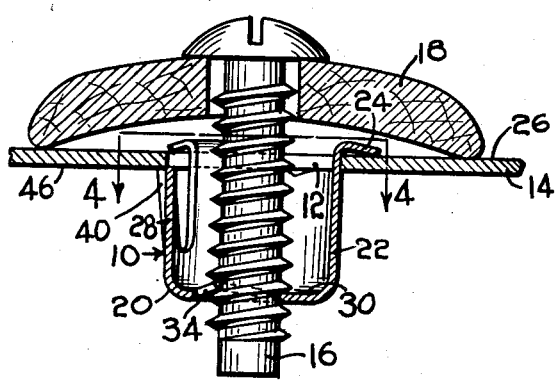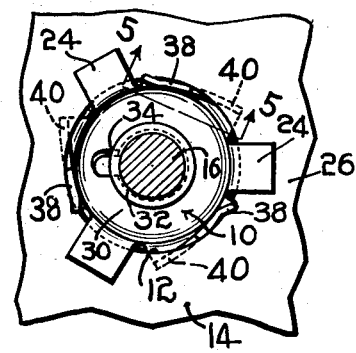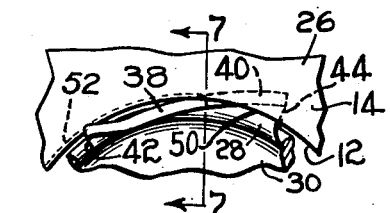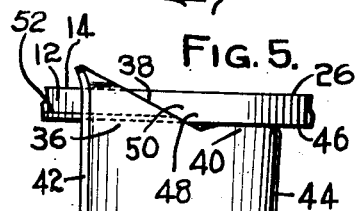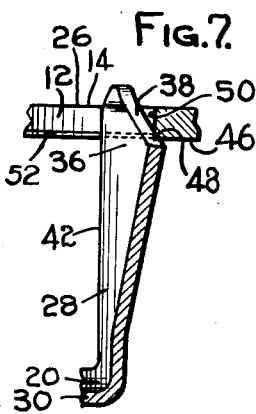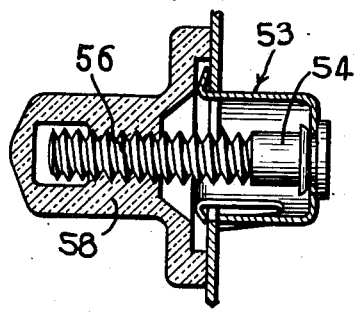
INVENTOR:
WILLIAM A. BEDFORD JR.,
BY Robert E Ross
AGENT.

2,667,200

UNITED STATES PATENT OFFICE 2,667,200

FASTENING DEVICE

William A. Bedford, Jr., North Scituate, Mass., assignor to United-Carr Fastener Corporation, Cambridge, Mass., a corporation of Massachusetts Application July 19, 1951, Serial No. 237,551

4 Claims. (Cl. 151—41.75)

This invention relates generally to fastening devices, and has particular reference to a sheet metal fastener adapted for non-rotatable assembly into a panel opening.

In the manufacture of automobiles, refrigerators, and other devices constructed by assembly line techniques it is frequently necessary to provide means in a panel to receive and engage a threaded member in positions where access is available to only one side of the panel. In such cases it has been common to use "blind assembly" snap-in fasteners which can be assembled into a panel opening from the accessible side. Since such fasteners are subjected to rotative forces during engagement of a threaded member therewith, means must be provided to prevent them from turning during assembly of the threaded member. This has sometimes been accomplished by providing a pre-punched square hole in the panel, and a fastener of suitable shape to non-rotatably engage therein. In other cases, where an article to be mounted onto the panel by means of the threaded member has a substantially flat portion to bear against the panel adjacent the opening, a circular opening may be used, and the fastener to be assembled therein is provided with radially extending feet to be gripped between the article and the panel as the threaded member is tightened, so that said feet prevent rotation of the fastener.

The use of a circular opening is usually preferred over a square opening, since the latter must be pre-punched, and hence when square openings are used, the position of the openings must be accurately predetermined before the panel is assembled, and slight errors in positioning the opening or in the dimensions of other parts of the device sometimes cause the pre-punched holes to be out of alignment in the final assembly. On the other hand, circular holes can be drilled rather than punched, and such holes can be formed rapidly on the assembly line in the exact position desired, without the necessity of forming them prior to the assembly of the panel. However, if the device to be assembled onto the panel has a shape such that no portion of it bears against the panel close to the opening, the provision of radially extending feet on the nut is not effective to prevent rotation thereof.

The object of the invention is to provide a sheet metal fastener which is adapted to snap into an opening in a panel so as to be non-rotatable therein during engagement of a threaded member.

A further object of the invention is to provide a sheet metal fastener for snapping engagement into a circular opening, in which means is provided for engagement with an edge of the wall of the opening to prevent rotation of the nut in a predetermined direction.

Another object of the invention is to provide a snap-in sheet metal fastener for non-rotative engagement into a circular panel opening in which a series of tongues on the fastener are provided with cutting edges which are inclined axially and radially for engagement with an edge of the wall of the opening to prevent rotation of the nut in a predetermined direction.

Other objects of the invention will, in part, be obvious, and will, in part, appear hereinafter.

In the drawing:

Fig. 1 is a view in side elevation of a fastener embodying the features of the invention;

Fig. 2 is a top plan view of the fastener of Fig. 1;

Fig. 3 is a view in elevation, partly in section, of the fastener of Fig. 1 illustrating its use in attaching a molding to a panel;

Fig. 4 is a view in section taken on line 4—4 of Fig. 3;

Fig. 5 is an enlarged view in section taken on line 5—5 of Fig. 4;

Fig. 6 is a top plan view, partly broken away, of the assembly of Fig. 5;

Fig. 7 is a view in section taken on line 7—7 of Fig. 6; and

Fig. 8 is a view in elevation, partly in section, of a modified form of fastening device embodying the features of the invention, illustrating its use as a shelf support for refrigerators or the like.

Referring to Figs. 1 to 7 of the drawing, there is illustrated a sheet metal fastener 10 which is adapted to snap into a circular opening 12 in a panel 14, to receive and engage a threaded member such as a bolt 16 to attach an article such as a curved molding 18 or the like to the panel. The fastener 10 is preferably formed of a single piece of sheet metal which has been hardened to provide a relatively stiff spring action in certain parts thereof for purposes to appear hereinafter, and comprises generally a substantially cylindrical hollow body portion 20 having a series of legs 22 formed therein extending toward one end of the body and terminating in radially outwardly turned feet 24 for bearing against the accessible or front side 26 of the panel, a series of tongues 28 formed in the body and extending toward said one end of the body for a purpose to be hereinafter described, and a base 30 disposed at the other end of the body having means therein for engaging a threaded member such as an opening 32 formed by a helical edge 34.

The legs 22 are preferably inclined slightly outwardly from the body so that when the nut is assembled into the panel opening 12, they will be sprung inwardly, and the feet 24 are slightly inclined axially in relation to the body toward the base 30 to provide a certain amount of tolerance to enable the fastener to engage panels of slightly different thicknesses.

The tongues 28 extend toward said one end of the body and are also slightly inclined outwardly so that they must be flexed inwardly to pass through the panel opening. Each tongue terminates in a free end 36 having a cutting end portion 38 and a snap shoulder portion 40 disposed thereon. The cutting end portion 38 extends from one side 42 of the tongue in an axially inclined and radially outwardly inclined direction, and the snap shoulder portion 40 is disposed on the other side 44 of the tongue and extends from the outermost portion of the cutting end portion and is flared radially outwardly therefrom. In the preferred embodiment the snap shoulder portion is also slightly inclined axially in a direction opposite to that of the cutting end portion, that is, it is inclined slightly away from the base toward said one end of the body. Hence, the cutting end portion of the tongue, as viewed in side elevation (see Fig. 6) extends axially from below the snap shoulder portion to a point a substantial distance above the snap shoulder portion, and as viewed in plan (see Fig. 7) extends from a point radially inside the snap shoulder portion outwardly to a point which will be outside the periphery of the panel opening when the fastener is assembled therein. To assemble the fastener with the panel, it is simply pushed base first through the opening from the accessible side of the panel, so that the snap shoulders 40 snap through the opening and spring outwardly to bear against the rear face 46 of the panel, with the feet 24 bearing against the front face of the panel. The cutting end portions 38 of the tongues also tend to spring outwardly when the snap shoulder portions spring outwardly, and bear against the rear edge 48 of the wall 50 of the opening. The direction of inclination of the cutting end portions, as previously described, is such that said cutting ends are inclined toward the rear of the panel from a point inside the opening and forward of the rear edge 48, and are also inclined radially outwardly so as to pass under and bear against the rear edge 48 (see Figs. 6-8).

When the molding 18 is assembled onto the panel by means of the bolt 16, rotation of the bolt to tighten it in the fastener 10 causes rotative forces to be applied to the fastener. It has been found that with the illustrated fastener, such forces may in some cases cause a certain amount of rotation of the fastener in the opening. However, such rotation causes the cutting end portions 38 to dig into the rear edge 48 of the wall of the opening, and in many cases the cutting end 38 shears off a portion of the edge, as shown at 52 in Figs. 6 and 8. The inclination of the cutting ends causes them to tend to cut deeper into the edge 48 until they dig in enough to stop the rotation of the fastener.

Usually such rotation stops after less than one complete revolution, and the fastener is then engaged with the panel so tightly that it will not rotate in the opening even if sufficient torque is applied to the bolt to strip the threads of the helix in the base.

The device is also useful as a shelf support in the manufacture of refrigerators. Referring to Fig. 8, there is illustrated a fastener 53, which is similar in construction to the fastener previously described, with the exception that instead of a helix in the base to engage a threaded member, a bolt 54 is assembled on the base, having a threaded portion 56 which extends through the body of the fastener and protrudes therefrom. The fastener 53 is assembled into a panel opening in the same manner as the fastener previously described, and after assembly, a shelf supporting member 58, which is internally threaded, may be screwed into engagement with the bolt.

In either modification, the angle of inclination of the cutting end in both the axial and radial direction may be varied to suit different applications, however, the illustrated device has been found suitable, when made of high carbon hardened steel, for engaging panels formed of low carbon steel.

Although in the illustrated embodiment the cutting ends are formed on the same tongues as the snap shoulder portions, for some applications they may be provided on separate tongues.

Since certain other obvious modifications may be made in the device without departing from the scope of the invention, it is intended that all matter contained herein be interpreted in an illustrative and not in a limiting sense.

I claim:

1. A fastener for snapping engagement into an opening in a panel so as to be non-rotatable therein, said fastener comprising a substantially cylindrical, hollow sheet metal body having an open end and a closed entering end having means therein for engaging a connecting member, the open end portion of said body being divided into a plurality of tongue portions separate from each other and connected to the body, the free ends of at least two opposed tongue portions having integral portions flanged outwardly to provide bearing surfaces against the front face of a panel securing the fastener thereto, each of the free ends of at least two of the remaining opposed tongue portions having a snap shoulder portion substantially perpendicular to the axis of the body and a cutting end portion extending therefrom, each shoulder portion being intermediate the ends of the body, each cutting end portion being inclined axially and outwardly from the shoulder portion and being disposed tangentially in relation to the body to extend across and bear against the rear edge of the wall of the opening when the fastener is assembled therein, said snap shoulder portion being flared outwardly from the cutting end portion to snap through the opening and bear against the rear side of the panel.

2. A fastener in accordance with claim 1 wherein the furthermost point of each cutting end portion is slightly flared outwardly and being just above the outside face of the panel when said fastener is positioned thereon.

3. A fastener in accordance with claim 1 wherein the closed entering end is provided with a threaded opening to receive a threaded connecting member.

4. A fastener in accordance with claim 1 wherein the closed entering end is provided with an opening to receive and retain a bolt therein.

WILLIAM A. BEDFORD, JR.

References Cited in the file of this patent

UNITED STATES PATENTS

| Number | Name | Date |
|---|---|---|
| 2,178,719 | Cotter | Nov. 7, 1939 |
| 2,539,172 | Andrews | Jan. 23, 1951 |